United States Patent [19]

Nelson et al.

[11] Patent Number: 5,736,865
[45] Date of Patent: Apr. 7, 1998

[54] CAPACITIVE ROTARY POSITION ENCODER

[75] Inventors: James Edward Nelson, North Branch;
Ronald Kenneth Selby, Burton;
Raymond Lippmann, Ann Arbor;
Michael John Schnars, Clarkston, all
of Mich.

[73] Assignee: Delco Electronics Corporation,
Kokomo, Ind.

[21] Appl. No.: 714,740

[22] Filed: Sep. 16, 1996

[51] Int. Cl.⁶ .................................................. G01R 27/26
[52] U.S. Cl. .................................... 324/660; 324/683
[58] Field of Search ............................... 324/600, 690,
324/207.25, 76.77, 660, 683; 73/307

[56]  References Cited

U.S. PATENT DOCUMENTS 4,788,546  11/1988  Sasaki ............................. 324/660
4,842,387   6/1989  Arai ................................ 324/660
4,879,552  11/1989  Arai ................................ 324/690

*Primary Examiner*—Christine K. Oda
*Attorney, Agent, or Firm*—Jimmy L. Funke

[57]  ABSTRACT

A circuit board has an arcuate array of conductor segments each subject to a digital waveform differing in phase for the various segments, and a concentric pickup conductor. A rotary encoder disk has a conductive pattern which sums and couples the waveforms from selected segments, depending on rotary position, to the pickup conductor. A synchronous phase detector generates a phase signal from the summed waveforms and the zero crossing of the phase signal is detected. A counter develops count signals used to generate the digital waveforms. The count signals are input to a latch which is clocked at the zero crossing point to latch the count value which is a digital measure of the encoder angle.

7 Claims, 8 Drawing Sheets

CAPACITIVE ROTARY POSITION ENCODER

FIELD OF THE INVENTION

This invention relates to rotary position encoders and particularly to a capacitively coupled rotary encoder having a digital output, and to a livid level sender employing such a sensor.

BACKGROUND OF THE INVENTION

It is often required to obtain an electrical signal representing the angular position of a rotatable element. In automotive applications the element may be a fuel level sender controlled by a float, a feedback for an instrument gauge, or a manually positioned knob for example. It is also desirable that the position information be in digital form for easy communication over a bus to another part of the vehicle.

For some applications it is already known to use rotary optical sensors, code wheels with inductive pickups, and rotary potentiometers. The most common variety of fuel level sensors consists of a float which is attached to the end of a pivot arm. A potentiometric or resistive divider device is operated by the pivot arm so that the value of resistance or the ratio of resistances corresponds to the fuel level. Where a wiper sweeps across a wire winding or across resistive inks, a fairly high amount of current flowing through the sensor is required to keep the contact from fouling over time. These higher currents require that electronic driving circuits use larger wattage resistive loads to operate the sender which can represent a significant source of heat generation in the instrument cluster. Whereas air core gauges utilize the analog sender signal, newer display technology often requires digital data, requiring analog to digital conversion. An additional concern with such senders is the presence of corrosive materials in fuel including alcohol and water, and sometimes salt water.

Lineal capacitive sensors using digitally excited electrodes and relatively movable sensing elements have been used with a phase detecting circuit to measure position along a straight line. It is desirable to employ the principles of such sensor in a capacitive rotary encoder suitable for liquid level and other measurements.

SUMMARY OF THE INVENTION

It is therefore an object of the invention to capacitively sense rotary position. Another object is to obtain a high resolution digital measurement of rotary position. A further object is to measure liquid level with a capacitive rotary sensor.

A rotary encoder has at least one group of at least three conductor segments in a circular array on a circuit board and an encoder disk rotatable about an axis concentric to the array bearing an encoder conductor capacitively coupled to certain ones of the segments. Depending on the rotary position of the disk different ones of the segments will be fully or partially coupled to the encoder conductor. For multiple groups, the encoder conductor will be aligned with corresponding segments of each group. The encoder conductor is capacitively coupled to a pickup conductor on the circuit board. Excitation signals applied to the segments will be summed on the encoder conductor, according to the degree of coupling, and passed to the pickup conductor.

A counter comprising a main counter and a prescaler is driven by a clock. The main counter produces a set of count signals which are fed to a logic circuit. The logic circuit then generates a set of digital excitation patterns which are coupled to respective segments in a group and to corresponding segments in other groups. The signal patterns are all the same but are displaced in phase. The sum of the signals on the pickup conductor is synchronously detected to form a differential signal which is nearly sinusoidal and its phase is a measure of the angular position of the encoder disk. The zero crossing of the differential signal is detected and used to clock a latch which latches the count signals to an output to obtain a digital measure of the angular position. For higher resolution, the prescaler signals are also latched to the output and combined with the main counter signals to furnish the position measure.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
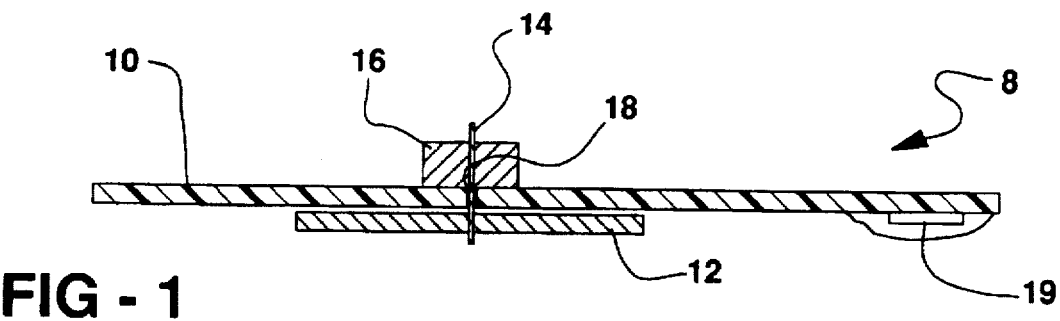
FIG. 1 is a side view of a rotary encoder according to the invention.

Referring to FIG. 1, a rotary encoder 8 comprises a stationary circuit board 10, a rotary disk 12 which is also a circuit board, a shaft 14 for holding the disk, and a bearing 16 on the circuit board 10 for rotatably mounting the shaft 14 which extends through a hole 18 in the circuit board 10. To produce signals representing the position of the shaft or an input device driving the shaft, conductive patterns on the board 10 and disk 12 are capacitively coupled according to disk angular position, and excitation signals are applied to the conductive patterns. The resultant signals are analyzed to determine the angular position. An integrated circuit 19 containing the electronic circuits discussed below is mounted on the circuit board 10.

Figure 2:
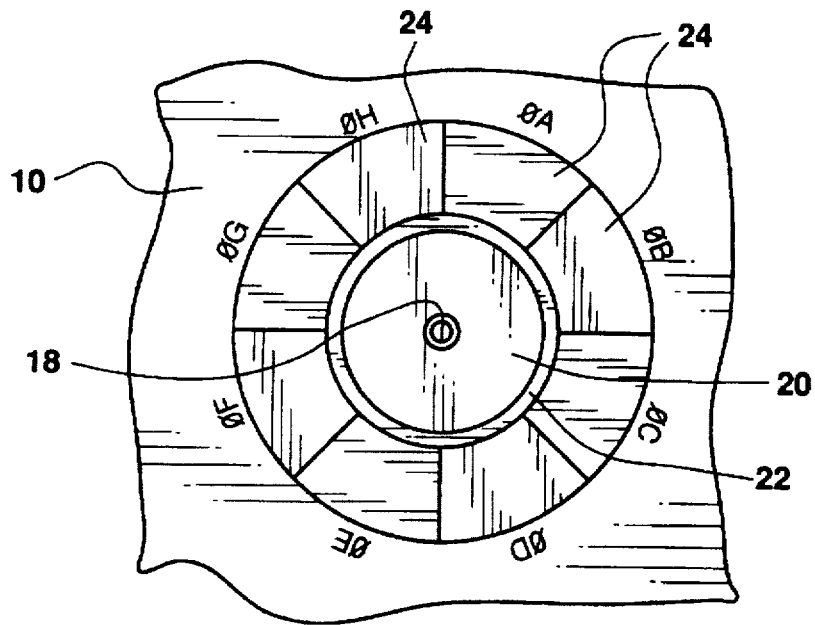
FIG. 2 is a front view of the circuit board of the encoder of FIG. 1.

FIG. 2 shows the conductive pattern applied to the circuit board 10. It includes a central pickup pad 20 surrounding the hole 18, an annular shield 22 around the pickup pad, and a circular array at least three conductive of segments 24 surrounding the shield. The shield 22 prevents capacitive coupling between the edges of the pickup pad 20 and the edges of the segments 24. Each of the segments 24 is designated as ØA-ØE according to the phase of its respective excitation signal. In this example eight segments are used.

Figure 3:
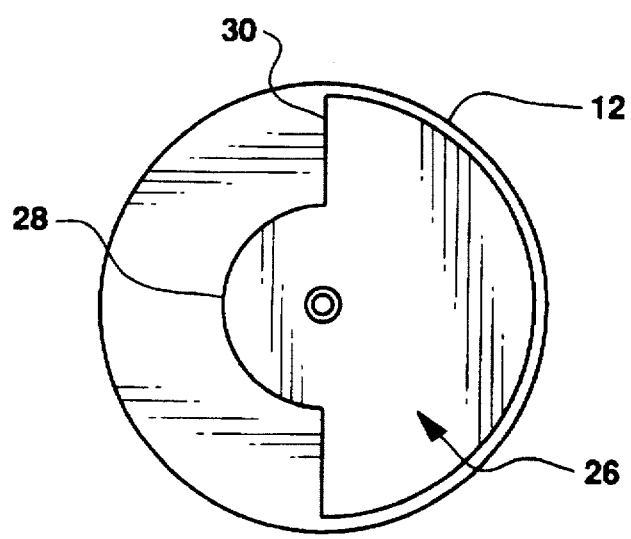
FIG. 3 is a rear view of the encoder disk of the encoder of FIG. 1.

The conductive pattern 26 on the disk 12 is an encoder pattern as shown in FIG. 3. It has a center circular portion 28 surrounding the shaft 14 and directly opposed to the pickup pad 20, and an outer portion 30 extending around half the disk and overlying half the segment array. In one position of the disk the outer portion will align with the segments ØA-ØD, and if rotated slightly, it will align with ØB-ØD and only portions of segments ØA and ØE, and so forth. The disk 12 is mounted sufficiently close to the circuit board 10 to capacitively couple the encoder pattern to the pickup pad and the segment array. Excitation signals imposed on the segments are coupled to the encoder pattern in proportion to the extent that any segment is aligned with or overlaps the encoder pattern. These coupled signal are summed on the encoder and coupled to the pickup pad 20. By selecting suitable excitation signals, the summed signal on the pickup pad will reflect the position of the rotor as a phase angle. This arrangement of capacitively coupled conductors 20–26 on the disk and on the circuit board comprises a rotary sensor 32.

Figure 4:
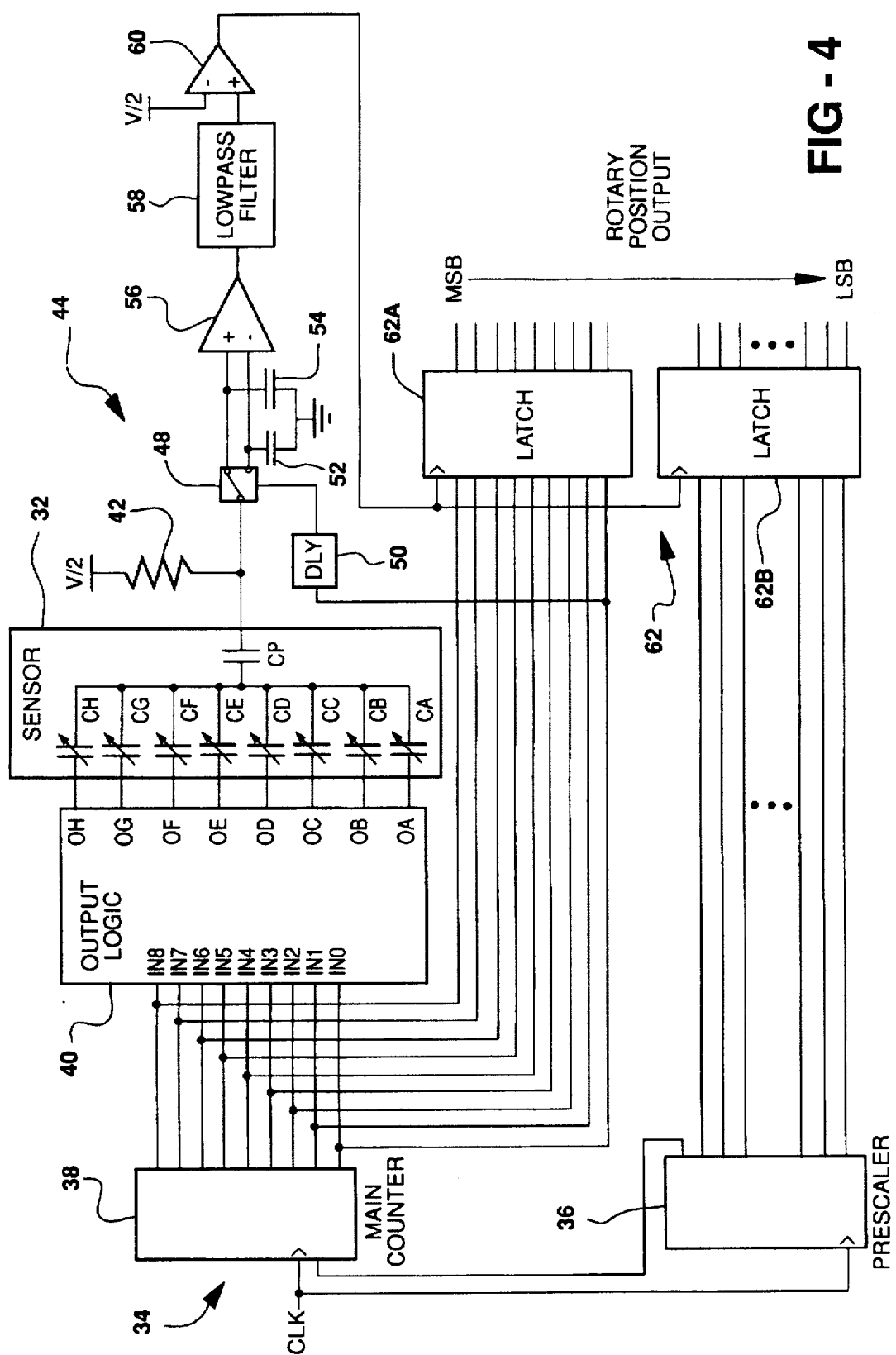
FIG. 4 is a schematic diagram of an electronic circuit for the encoder of FIG. 1.
Figure 5A:
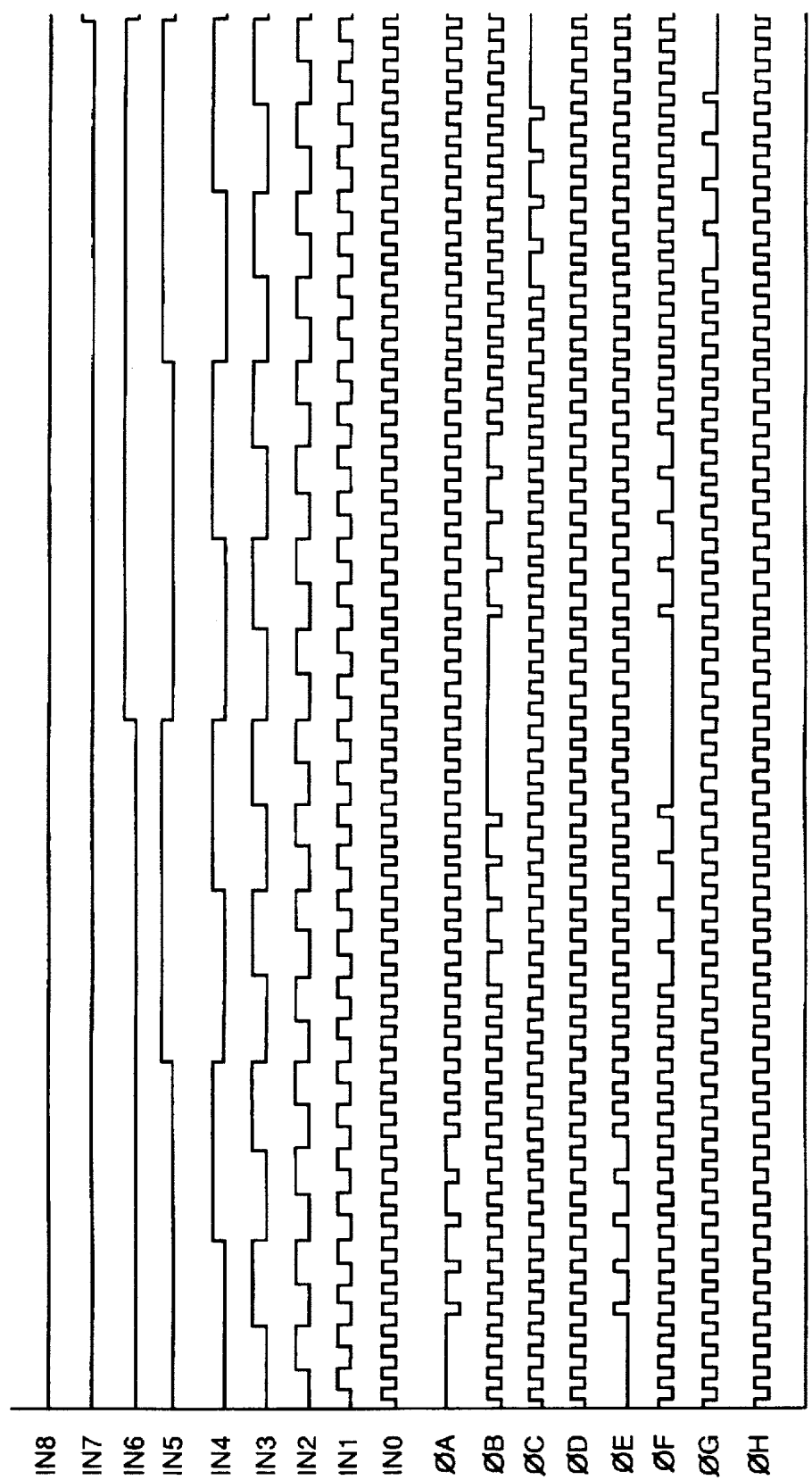
FIGS. 5A and 5B are clocking and driving waveforms used in the circuit of FIG. 4.
Figure 5B:
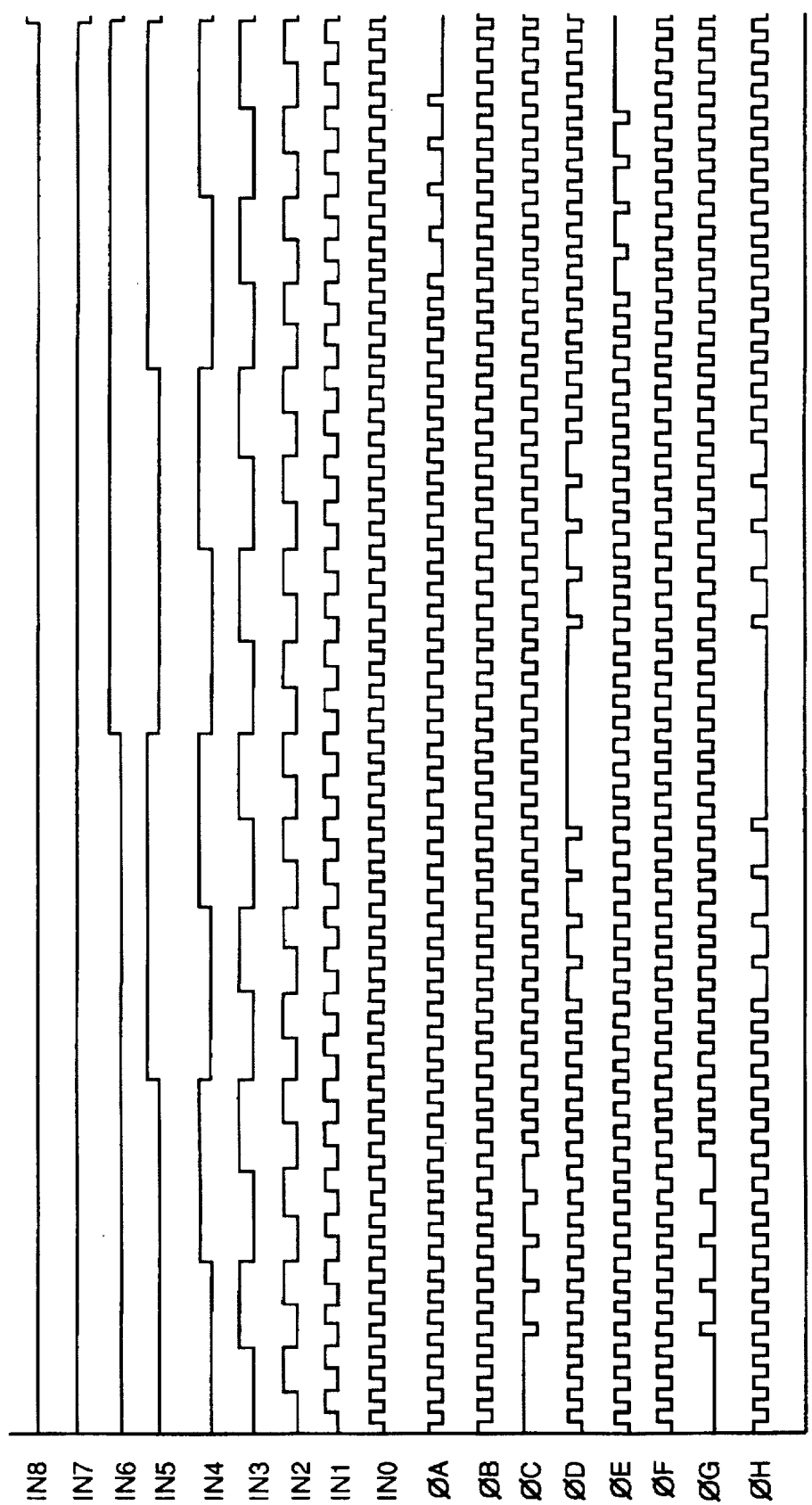

The circuit which drives and detects this sensor 32 is shown in FIG. 4. A counter 34 comprising a prescaler 36 and a main counter 38 is clocked by a clock signal which causes the prescaler to count every clock pulse and issue a carry signal which is coupled to a clock enable pin of the main counter 38. Thus the main counter is clocked once for each complete cycle of the prescaler. The main counter is preferably a 9 bit counter and its outputs are coupled to pins IN0 to IN8 of a logic circuit 40. The outputs ØA-ØH of the output logic are digital waveforms which are identical but differing in phase; each signal is delayed by 64 counts of the main counter from an adjacent signal. For example, ØB begins its sequence 64 counts after ØA begins its sequence. The entire sequence repeats for each waveform every 512 counts of the main counter. These outputs along with the inputs IN0-IN8 are shown in FIGS. 5A and 5B which cover one half of a complete cycle. Thus IN8 remains low until the end of FIG. 5B and then remains high for the other half of the main counter cycle, not shown. The signal IN0 is the base count of the main counter 38 and comprises a continuous stream of high frequency digital pulses.

Each of the output signals ØA-ØH comprises streams of high frequency pulses interrupted by a group of four pulses at half the main counter frequency, a break lasting for eight main counter pulses, and resuming with another four lower frequency pulses. The phase of the pulses changes after each break. For example, in FIG. 5A ØB is initially in phase with the main counter signal IN0 and after the break it is in inverse phase with IN0. The signals ØE-ØH are the logical inverses of ØA-ØD, respectively. The waveform sequences appear to be very complex but they are easily derived from the main counter outputs with a small number of gates.

Referring again to FIG. 4, the waveforms ØA-ØH output from the logic circuit are each coupled to one of the segments 24 which, along with the encoder pattern, comprises one of the capacitors CA-CH. The pickup pad 20 and the encoder pattern 26 comprise another capacitor CP which couples the summed signals out of the sensor 32. That output is coupled to V/2 via a resistor 42 and to a synchronous detector 44. The detector 44 includes an analog switch 48 operated by the main counter signal IN0 which is fed through a delay circuit 50. One switch 48 output is connected to a capacitor 52 and a second output is connected to capacitor 54 to develop a differential phase signal. A differential amplifier 56 is coupled to the two capacitors and the amplified phase output is connected through a switched capacitor low pass filter 58 to a comparator 60 referenced to V/2 to determine the zero crossing point of the phase signal. A latch 62 has a first section 62A having inputs coupled to the main counter outputs and a second section 62B having inputs coupled to the prescaler outputs. Both latch sections are clocked by the zero crossing signal from the comparator 60 so that the latched output will be a precise measure of the phase angle which is the measure of the encoder angular position.

Figure 6:
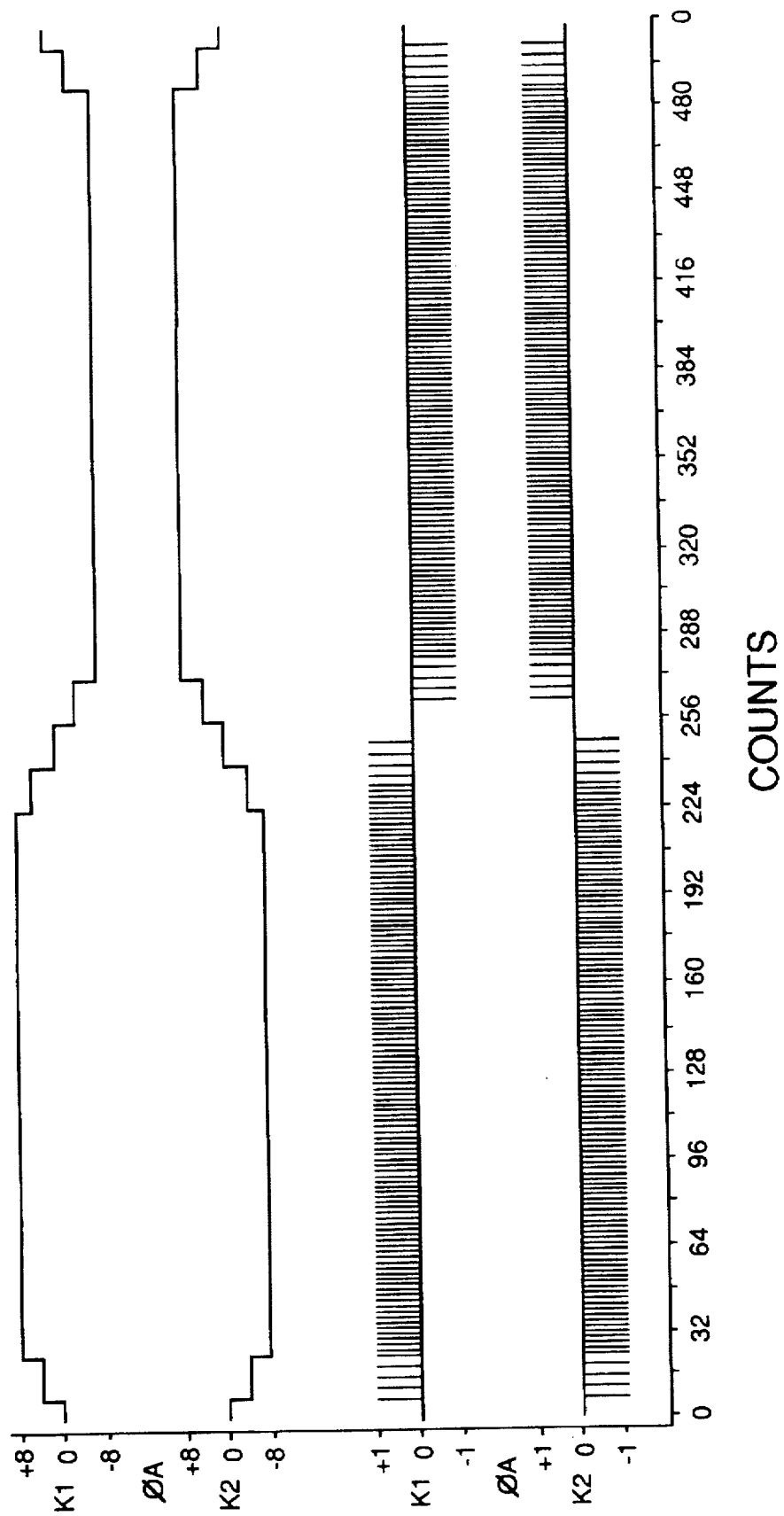
FIG. 6 is a set of current waveforms developed by the circuit of FIG. 4.

The analog switch control input is derived from IN0 and is delayed to guarantee that the analog switch state is held stable when signals ØA-ØH switch. With this arrangement, charge is pumped by the transitions present on the signals ØA-ØH through the sensor capacitors, CA-CH and through the pickup capacitor, CP, to the capacitors 52 and 54. The capacitors 52 and 54 are alternately connected to the pickup capacitor CP by the analog switch 48. It can be seen that 1) rising edges increase the voltage and falling edges decrease the voltage; and 2) similarly, rising and falling edges present on signals ØA-ØH that are inverted in phase with respect to IN0 cause charge to be pumped to and from capacitor 54. This is illustrated for ØA in FIG. 6. The bottom two traces show the current pulses into capacitors 52 and 54 as a result of the transitions on ØA as a function of main counter counts. The top two traces show the number and polarity of current pulses occurring in each eight count interval, an average current. One waveform is the exact negative of the other; the differential nature of these two signals is important for noise rejection. The other seven drive signals generate similar waveforms but with different phase relationships. FIG. 6 does not reflect the reduction of amplitudes occurring when a capacitance CA-CH is less than the maximum value due to partial coupling of a segment with the encoder pattern.

Figure 7:
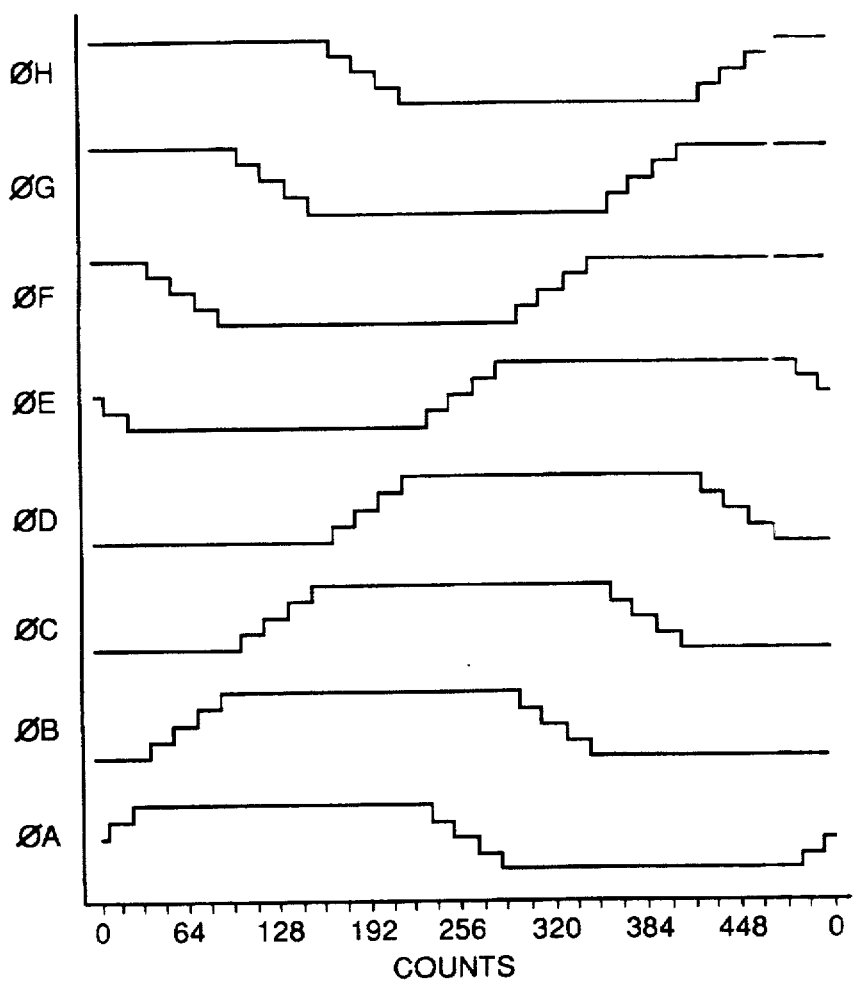
FIG. 7 is a set of current waveforms for the several phases developed by the circuit of FIG. 4.
Figure 9:
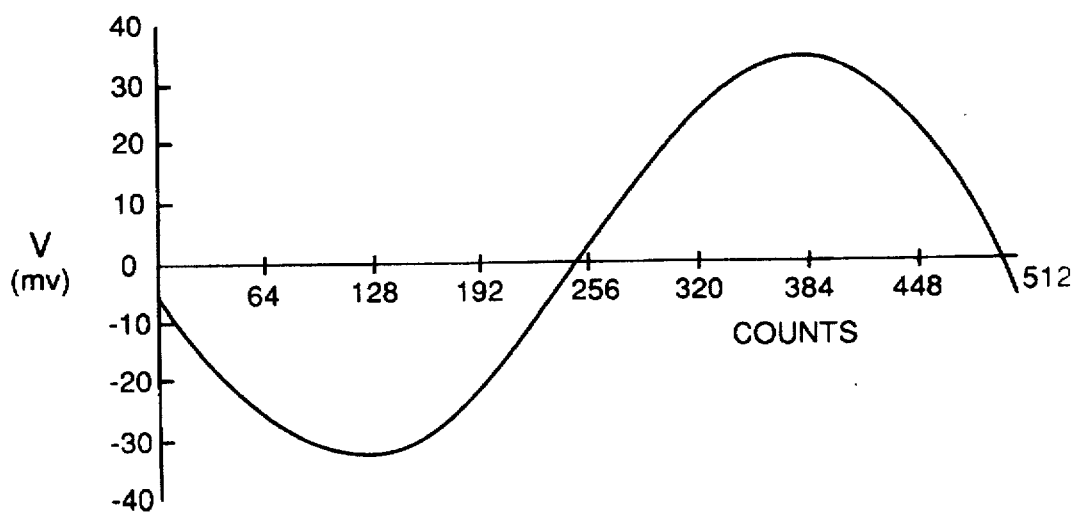
FIG. 9 is a graph of a phase signal developed by the circuit of FIG. 4.
Figure 8A:
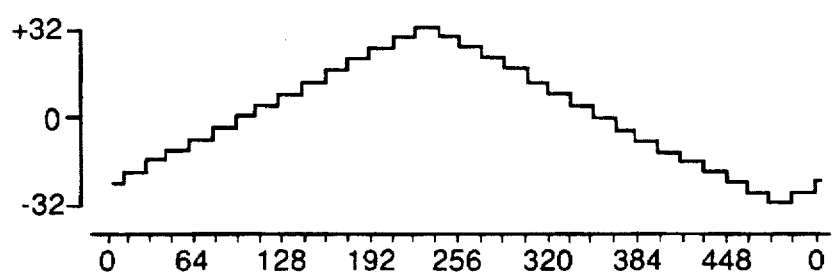
FIGS. 8A–8D are summed current waveforms for certain phases.
Figure 8B:
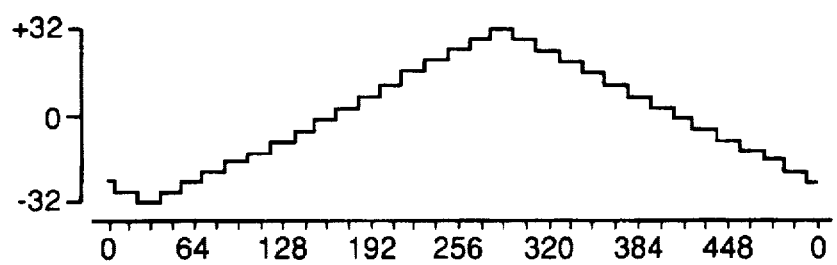
Figure 8C:
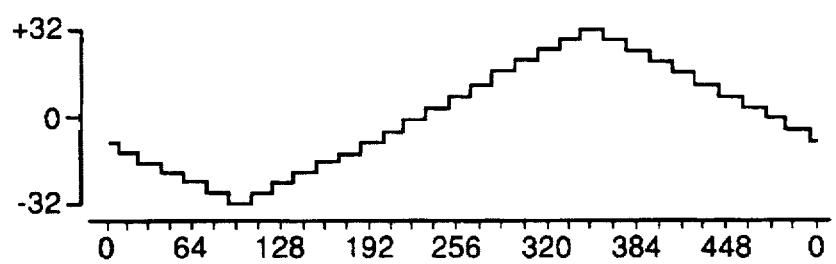
Figure 8D:
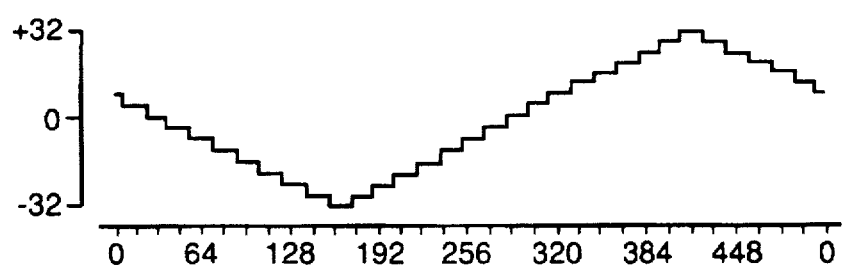

The currents contributed by each of the eight drive signals are summed by the sensor in proportion to their respective capacitors CA—CH. FIG. 7 shows maximum average current for each of the eight drive waveforms for capacitor 52. FIGS. 8A-8D respectively show the summed currents for ØA through ØD (0°), ØB through ØE (45°), ØC through ØF (90°), and ØD through ØG (135°). Intermediate positions are not shown. For each increment of encoder rotation the summed current waveform (and the resulting voltage waveform) is correspondingly shifted linearly. Thus by measuring the phase angle the encoder position is also measured. The capacitor voltage waveform is the integrated capacitor current waveform and is shown in FIG. 9. This is the voltage waveform for the sum of ØA through ØD or 0°. The zero crossing point is measured at the crossing of the decreasing voltage. A phase shift due to the low pass filter causes a small offset of 0 count from 0°. The switched capacitor filter 58 causes the offset to be constant with temperature. Also a switched capacitor filter can be implemented totally in silicon without external components to thereby minimize its cost.

To develop the phase signal, the differential amplifier 56 differentially amplifies the voltage on capacitors 52 and 54. The filter 58 is a second order low pass filter inserted after the amplifier 56 to remove some distortion which is possible due to the encoder crossing between the various drive signal phases. The phase signal is biased to swing about V/2 and is compared to V/2 with the analog comparator 60 to determine the zero crossing point. The output of the comparator 60 is synchronized to the system clock and the main counter is then latched.

Latching the main counter value gives nine bit resolution. Each count of the main counter latch corresponds to 360/512 degrees of rotation. The prescaler counter 36 allows the position of the zero crossing of the phase signal to be discriminated with additional accuracy. Adding prescaler bits increases resolution, but increases the required clock frequency. A binary prescaler with P bits resolves each count of the main counter into $2^P$ prescaler counts. Each count of the prescaler latch then corresponds to $360/(512 * 2^P)$ degrees of rotation.

Figure 10:
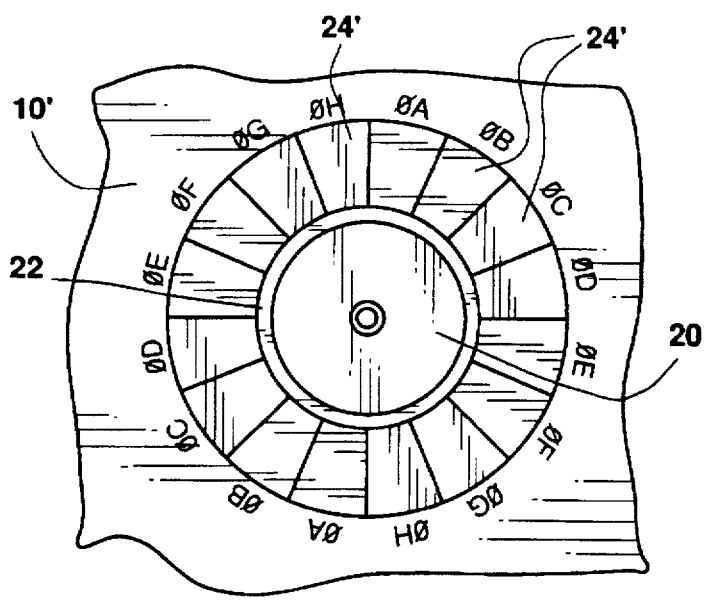
FIG. 10 is a front view of the circuit board of a second embodiment of the encoder of FIG. 1, according to the invention.
Figure 11:
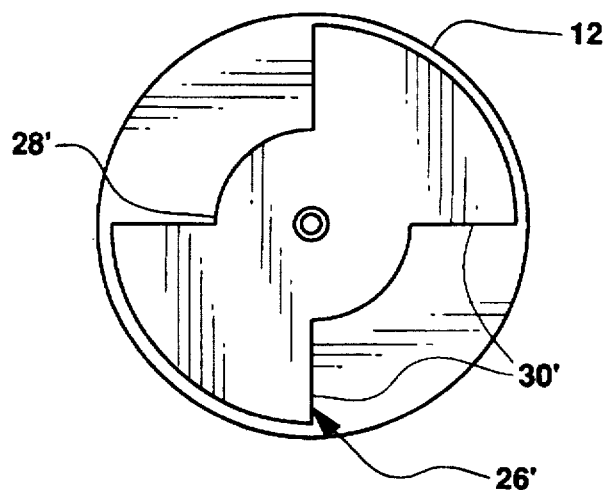
FIG. 11 is a rear view of the encoder disk of the second embodiment of the encoder of FIG. 1.

Additional resolution can be obtained by adding multiple cycles of the drive waveforms to the circuit board and encoder disk patterns. The same sequence of drive waveforms ØA–ØH is repeated more than once around the periphery of the encoder, and the encoder disk pattern is modified to couple to the multiple cycles of the drive signals. A two cycle pattern is shown in FIGS. 10 and 11. The segment array includes 16 segments 24' so that each drive signal is applied to two different segments. The encoder disk pattern 26' is shaped as a center circular portion 28' with two outer lobes 30' to simultaneously couple to corresponding segments in each cycle. The behavior of a multiple cycle encoder is similar to a single cycle encoder with the exception that the measurement is performed over a decreased angular span (360/N) where N is the number of cycles. The position measurement is no longer absolute, the measurement repeats N times over 360 degrees. An up/down counter can be incorporated to keep track of which cycle the measurement is on with simple logic. Some means must be included to initialize this counter to correspond to the desired cycle on power-up to get an accurate reading. An eight cycle encoder has been successfully operated.

In the examples illustrated herein eight segments per cycle and corresponding eight driving waveforms are employed. Other numbers may be used however. It is expected that as few as three segments and driving signals could be used, although with lower resolution.

Figure 12:
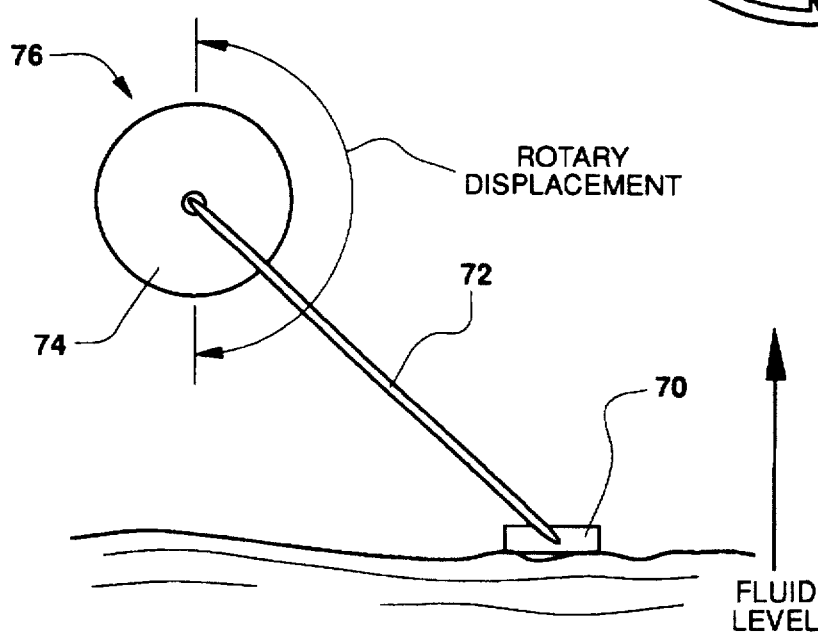
FIG. 12 is a front view of a rotary encoder in a liquid level sensor, according to the invention.

FIG. 12 illustrates an application of the rotary encoder as a fluid level sensor of the type used in vehicles to measure the level of fuel in a tank. A float 70 on an arm 72 drives the encoder disk 74 of a rotary encoder 76 as a function of the fluid level. The encoder 76 is like the encoder 8 discussed above. As fluid level changes, the encoder disk is rotated as fluid level varies. The fluid level does not have any minimum or maximum limits, and the encoder will travel up to 180°.

Some advantages of the capacitive rotary fuel level sensor are:

1) The sensor provides a digital output which is a function of fluid level. This digital information can be directly transmitted from a remote location by integrating a serial transmitter into the electronics. The digital format leads to greater accuracy since the variable resistance of the vehicle harness is not a factor.

2) External noise is eliminated. Typical analog sensors on the other hand are extremely sensitive to power supply noise and line noise.

3) Microprocessor interface to this sensor is inexpensive via serial interface, whereas typical analog sensors require expensive analog to digital converters.

4) There is no requirement for the electrical parts to make moving contact as in a resistive potentiometer or to be otherwise exposed. Where the sensor is exposed to corrosive elements, the metal portions are readily encapsulated in plastic or other protective coating and can be safely used in fuel containing corrosive liquids such as alcohol. In contrast, analog sensors require expensive protection to avoid corrosion including special low current circuits to reduce the effects of electrolytic destruction.

5) A loading impedance required for analog sensors is not required.

It will thus be seen that the rotary capacitive encoder can be used in many applications and is especially desirable where low cost, high accuracy, extremely high resolution, robustness and reliability are desired. In addition to the fuel level sensor described above, some of those applications in a vehicle are feedback of a gauge pointer position, a throttle position sensor, a suspension system sensor, air controls air door position sensor, a rotary switch or knob position sensor, and an attitude sensor.

We claim:

1. A rotary position encoder comprising:

a circuit board having at least three conductive segments in a circular array and a pickup conductor concentric with the array;

an encoder disk mounted adjacent the circuit board for rotation about an axis concentric with the array;

means for supplying a pattern of digital signals to the conductive segments, the signal patterns differing in phase for each segment;

means for selectively summing the signals as a function of rotary position of the encoder disk comprising an encoder conductor on the disk capacitively coupled with some of the segments according to the rotational position;

the encoder conductor including a region capacitively coupled with the pickup conductor so that for segments coupled to the encoder conductor the respective signals will be summed and coupled to the pickup conductor;

a detector circuit connected to the pickup conductor for producing a phase signal; and means for determining the phase of the phase signal wherein the phase is a measure of the rotational position of the encoder disk.

2. The invention as defined in claim 1 wherein:

the detector circuit comprises a synchronous detector connected to the pickup conductor for receiving the summed signals and producing a differential phase signal; and a differential amplifier is coupled to the detector circuit for amplifying the differential phase signal.

3. The invention as defined in claim 1 wherein the means for determining the phase of the phase signal includes a zero crossing detector.

4. The invention as defined in claim 1 wherein the means for supplying a pattern of digital signals comprises:

a counter for generating a plurality of count outputs; and a logic circuit coupled to the count outputs for generating the pattern of digital signals.

5. The invention as defined in claim 4 wherein the circuit for determining the phase of the phase signal includes:

a zero crossing detector coupled to the phase signal for producing a zero crossing signal; and a latch clocked by the zero crossing signal and having data inputs comprising the count outputs, whereby the count latched by the zero crossing signal is a measure of the phase.

6. The invention as defined in claim 5 wherein the counter comprises:
   a main counter providing count outputs to the logic circuit and to the latch; and
   a prescaler providing count outputs to the latch, whereby the count latched by the zero crossing signal is expanded to increase the resolution of the phase measurement.

7. The invention as defined in claim 1 wherein the conductive segments in an array which are supplied by the pattern of signals comprise one of a plurality of groups of corresponding segments which are replicated in other parts of the array and supplied by the same pattern of signals, and the encoder conductor is formed to selectively sum the signals from corresponding segments of all the groups.

* * * * *